United States Patent [19]

Slattery

[11] Patent Number: 4,737,418

[45] Date of Patent: Apr. 12, 1988

[54] NICKEL CLAD CORROSION RESISTANT LID FOR SEMICONDUCTOR PACKAGE

[75] Inventor: James A. Slattery, Sauquoit, N.Y.

[73] Assignee: Advanced Materials Technology Corp., Oriskany, N.Y.

[21] Appl. No.: 945,390

[22] Filed: Dec. 22, 1986

[51] Int. Cl.[4] ............................................ B32B 15/01
[52] U.S. Cl. .................................... 428/672; 428/678;
428/679; 427/125; 427/284; 427/360; 427/438;
228/190; 228/208; 228/209
[58] Field of Search ....................... 428/678, 679, 672;
427/125, 438, 360, 367, 284; 228/190, 208, 209

[56] References Cited

U.S. PATENT DOCUMENTS

| 3,364,064 | 1/1968 | Wijburg | 428/679 |
| 4,243,729 | 1/1981 | Hascoe | 428/336 |
| 4,601,958 | 7/1986 | Levine | 428/672 |
| 4,620,661 | 11/1986 | Slatterly | 204/40 |

Primary Examiner—Shrive P. Beck
Assistant Examiner—Vi Duong Dang
Attorney, Agent, or Firm—Bruns and Wall

[57] ABSTRACT

A lid for closing an electronics package exhibits a high corrosion resistance. The lid is formed of a metal substrate which is clad with rolled or worked nickel, and covered with a layer of gold or precious metal electroplate. At edges of the lid, which are not covered with cladding, a layer of nickel is electroplated, employing the dogbone effect to concentrate the metallization at the edges. The rolled or worked metal has a much smaller porosity than an electroplated layer, and the nickel cladding can be applied to the desired thickness in much less time than nickel electroplate.

13 Claims, 1 Drawing Sheet

NICKEL CLAD CORROSION RESISTANT LID FOR SEMICONDUCTOR PACKAGE

BACKGROUND OF THE INVENTION

This invention relates to a corrosion resistant lid or cover for closing a semiconductor package and to a method or process of forming such a cover or lid. The invention is particularly directed to an improvement over multilayer electroplated metal lids.

In many semiconductor applications, the semiconductor device is required to be hermetically sealed within a "package" or housing which protects the device from the surrounding ambient and thus enhances its reliability. As explained in further detail in U.S. Pat. Nos. 3,340,602; 3,538,597; 3,874,549 and 3,946,190, the package typically includes a container having a cavity in which the device is securely seated. Electrical leads are passed out of the container and are connected to appropriate circuitry. The package is closed using a lid which is placed in registration over the cavity and sealed in place using a eutectic solder frame formed of an alloy of 80% gold and 20% tin.

The lid that is used throughout the industry is typically made from a Kovar stamping. Kovar is a well known trade name that identifies an alloy containing various amounts of cobalt, nickel and iron. Lids have typically been provided with a top coating of gold over an inner layer of nickel. The coating provides an excellent bonding surface for the solder frame and also provides a corrosion resistant shield for the Kovar substrate which, because it contains iron, is highly susceptible to rust damage. The nickel interface usually consists of between 50 and 350 microinches of low stress nickel while the top coat consists of about 50 microinches of pure gold. Although this dual combination exhibits good solderability, the lid nevertheless will rust when exposed to a corrosive atmosphere for any period of time. Corrosion in amounts of between 2-4% of the total surface area of the lid will generally occur within 24 to 96 hours when the coated lid is exposed to a salt-containing atmosphere.

The accepted standards in the industry which governs the amount of corrosion allowable for high reliability packages is set out in the military specification Mil. Std. 883 C. This specification has been recently revised so that all lids now must remain corrosion free (zero corrosion) after being exposed to a salt containing atmosphere for at least 24 hours. Dual coated lids found in the prior use, i.e., those having only a single coating of nickel and a top coating of gold, continually fail the corrosion test as set out in these specifications.

All electroplated metal coatings exhibit porosity to some extent and thus permit rust producing atmospheres to pass therethrough to the base metal. Methods have been tried with varying degrees of success to reduce the porosity of protective coatings and to increase the resistance of these lids to corrosion. Porosity is usually inversely proportional to the thickness of an electroplated metal and the pores that initially form in the coating material close gradually as more metal is deposited. As the coating thickens, the pores eventually close. Approximately 2000 microinches of nickel and about 100 microinches of good are required, however, to completely close the pores on a dual coated lid. (See Harper, Charles A., Handbook of Materials and Processing for Electronics. McGraw Hill, 1970, p. 10–56). The consumption of this amount of metal is not only expensive, but also requires an extraordinary amount of production time to complete the plating process. Typically, the nickel electroplate requires four to six hours for each 100 microinches of nickel.

Pulse plating has also been tried with some limited success in an effort to close the pores in the coating materials. In this process, the current applied to the electroplating tank is pulsed on and off periodically by a square wave generator. The pulsing provides for increased ion mobility in the bath which, in turn, results in a smaller more densely packed crystal structure in the electroplated metals. This denser deposit is believed to fill the pores more rapidly and thus provide greater protection for a given coating thickness. Although the amount of corrosion may be reduced by this technique, pulse coating alone cannot provide economically feasible products capable of meeting the new standard within the industry.

A multilayer electroplated Kovar plate cover or lid has been proposed, e.g. in U.S. Pat. No. 4,601,958 and in U.S. Pat. No. 4,620,661. In such a lid, the Kovar substrate has a multilayered protective coating electroplated on it which comprises a first layer of nickel, a second layer of a noble metal or an alloy containing a noble metal, a third layer of nickel and a top layer of gold. The multilayered coating serves to not only close the pores in the coating structure and thus enhance the lid's resistance to corrosion, but also preserves the lid's ability to be hermetically sealed to the package. These lids or covers have been quite successful in meeting or exceeding the specifications of military specifications Mil. Std. 883 C. The multilayer coating achieves a superiority in porosity, and thus is less penetrable by corrosive electrolytes so that the Kovar base metal will not oxidize and corrode. Nevertheless, this multilayer system does have a few drawbacks.

Because at least four distinct electroplating operations must be carried out on the Kovar substrate, at least twice as much time is required to complete the production as is required for a two layer electroplating operation.

The intermediate gold layer, being sandwiched between nickel layers, is impossible to recover by commercially economic means. In the event that the lids or covers are rejected and must be scrapped, only the outer gold layer can be salvaged from the lids. No economic process exists to strip the second nickel layer, so the first layer of gold or other noble metal cannot be recovered from the rejected lids.

The second nickel layer can be blistered, and lose adhesion from the gold layer beneath, due to stressing that is often present under electroplating conditions. The resulting blisters can crack and cause failure of the protective plating and corrosion of the Kovar substrate beneath.

Finally, the porosity of electroplated nickel and gold is rather high compared to worked or cast metals, even in a multilayer system. An ideal corrosion resistant lid should have the crystalline grains of the nickel closely fitting against one another to avoid the pores or gaps at the grain boundaries, but this cannot be reasonably accomplished by electroplating.

OBJECTS AND SUMMARY OF THE INVENTION

It is therefore an object of the present invention to improve electronic packages used to house semiconductor devices to avoid the above-mentioned drawbacks of the prior art.

It is a further object of the present invention to improve lids used to hermetically seal semiconductor packages.

It is a still further object of the present invention to improve the corrosion resistant properties of a closure lid for a semiconductor package without sacrificing the solderability of the lid.

It is another object of the present invention to provide a multilayered coating for a electronic package closure lid that will resist corrosion over a long period of time when exposed to a corrosive atmosphere.

Still another object of the present invention is to provide a lid for closing an electronic package that fully conforms with the prevailing industry standards.

It is a more specific object of this invention to provide a lid or cover which is more economic to produce, both in terms of time and material, than corrosion-resistant lids currently proposed and/or employed in the industry.

It is yet a further object to produce a lid from which a precious metal coating can be completely recovered in the event the lid is rejected.

According to an aspect of this invention, an iron-based substrate, e.g., a Kovar sheet, is provided with a nickel cladding that is rolled or worked to a thickness of 250 to 350 micro-inches. The clad sheet, which can be in strip form, is divided into individual covers of various sizes, for example 0.505 inch squares. At this point, there is a low porosity nickel coating on the major surfaces of each square, but the Kovar substrate is exposed at the edges. The clad squares are then covered with a nickel electroplate, and here the plating constraints are adjusted to maximize the "dogbone" effect, i.e., concentration of metal at the edges, so that the edges receive about 75-300 microinches of nickel. On top of this a gold layer of at least about 50 microinches is electroplated. A gold-tin solder frame is affixed onto the gold plated lid at its periphery, and the lid or cover is ready to be sealed onto the top opening of the semiconductor package.

The above and many other objects, features and advantages of this invention will be more fully understood from the ensuing description of a preferred embodiment which should be considered in connection with the accompanying drawing.

DETAILED DESCRIPTION OF THE PREFERRED EMBODIMENT

Figure 1:
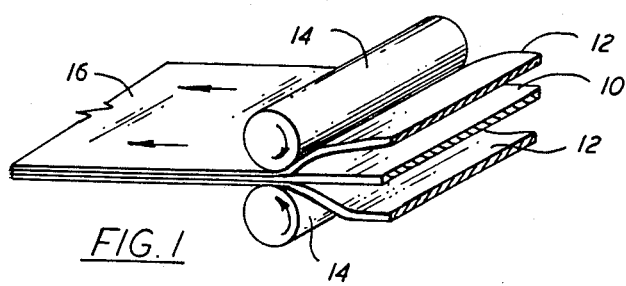
FIG. 1 is a perspective view of a sheet or strip of Kovar or like iron-based substrate material being mechanically clad with nickel foil.

With reference to the drawing, and initially to FIG. 1, a Kovar strip or sheet 10 of a typical thickness of 10 mils. (0.010 inches), after having been suitably cleaned and pretreated, is coated with layers of nickel foil on its top and bottom surfaces. This assembly of the sheet 10 and nickel foil layers 12 is worked between upper and lower rollers 14 to produce a nickel clad Kovar sheet 16. In the sheet 16 the layers 12 have a final thickness of between 200 and 350 microinches. Here, the foil 12 is pure nickel, but a nickel alloy could be employed instead, or the cladding could consist of a nickel/noble metal/nickel sandwich. Also the working need not be strictly limited to rolling, so long as the nickel porosity is reduced and grains of the metal pressed together.

Figure 2:
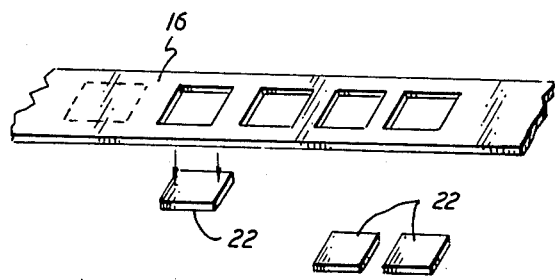
FIG. 2 is a perspective view of the nickel clad Kovar sheet or strip from which individual lids or covers are punched or divided.
Figure 3:
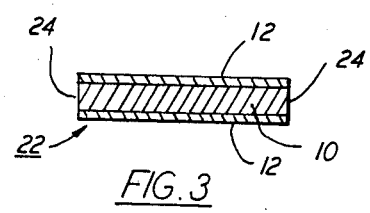
FIGS. 3, 4, and 5 are cross sections of the lid of this invention showing stages of the process of manufacture.

After the cladding step, the nickel clad Kovar sheet 16 is in strip form and divided into individual lids 22 as illustrated in FIG. 2, here 0.505 inch squares. This is carried out by punching the strip 16. Each square lid 22 at this point has the form shown in cross section in FIG. 3, namely a sandwich construction of nickel cladding 12, Kovar substrate 10, and nickel cladding 12. At side edges 24 of the lids 22, the Kovar substrate 10 is exposed.

Figure 4:
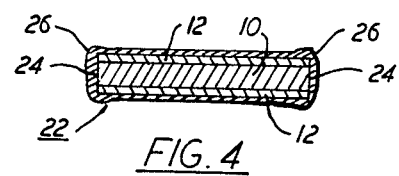

Following this step, a nickel electroplate layer 26 is applied, as shown in FIG. 4. The electrolyte concentration and pH, as well as temperature and plating current are controlled to maximize the "dogbone" effect, so that metallization is concentrated at the edges 24. At the end of this step, the nickel electroplate layer 26 has a thickness, at the edges 24, of substantially 250 microinches. This should be at least 75 but need not exceed 300 microinches. Some nickel is also deposited on the upper and lower surfaces, i.e. atop the nickel cladding layers 12. However, this is a rather thin layer, on the order of about 10 microinches.

In an optional embodiment, the edge electroplate layer 26 can be a nickel/precious metal/nickel sandwich, although it has been found that the corrosion resistance is quite high for the pure nickel electroplate employed in this embodiment.

Figure 5:
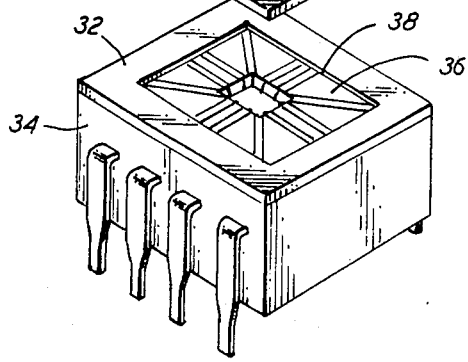

Finally, a gold electroplate layer 28, or a plating of another noble metal or noble metal alloy, is deposited over the entire surface of the lid 22, as shown in FIG. 5. Here, the gold layer 28 has a thickness of 25-60 microinches. It has been found that an outer gold layer of 25 microinch thickness produces satisfactory results; however, many customers specify that the outer gold layer 28 should have a 50 microinch minimum thickness.

Figure 6:
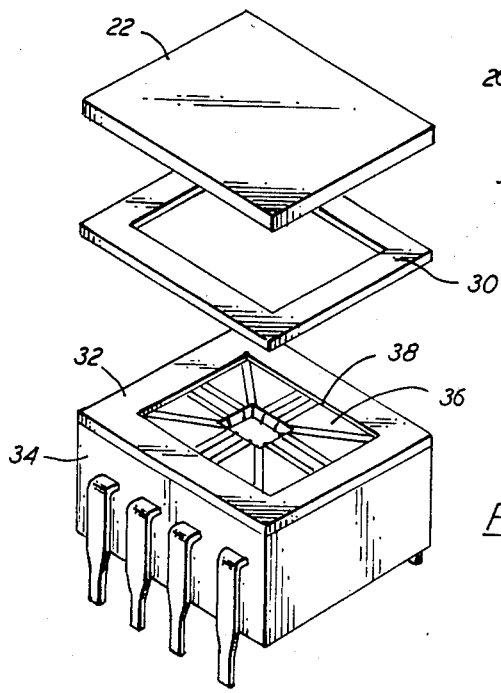
FIG. 6 is a perspective exploded view of an electronic package showing the lid and a solder frame associated with the package.

Turning now to FIG. 6, which illustrates a typical electronics package, the lid 22 of this invention is fitted with a solder frame type sealing ring 30, preferably of an 80/20% gold/tin solder. The lid 22 is then affixed by means of the solder frame 30 to a metallized apron 32 formed on a peripheral surface of a ceramic housing or container 34. A semiconductor device 36 is contained in a cavity 38 of the housing or container 34. Heat is applied to the solder frame 30, and the solder thereof fuses to the apron 32 and to the gold layer 28 of the lid 22 to form a hermetic seal.

EXAMPLE

A batch of lids were formed from a sheet of Kovar 0.010 inches thick clad on both sides with a foil of pure nickel whose worked or rolled thickness was substantially 350 microinches. These lids were electroplated with substantially pure nickel to form a nickel plating at the lid edges with a minimum thickness of 50 microinches. Here the plating constraints were adjusted so that the bulk of the plating was at the edges, and only about 10 microinches or less was deposited on the nickel cladding. A uniform gold electroplate layer was deposited over the entire lid, this layer having a thickness of about 50 microinches.

The multicoated lids were then cleaned and placed in a precleaned exposure chamber upon a special support bracket made of a non-corrosive material that will not cause electrolytic corrosion when placed in contact with the lids. A solution having a salt concentration of between 0.3 and 0.5 percent by weight sodium chloride in water was prepared and the pH of the solution adjusted to about between 6.0 and 7.5 at 95° F. The specimens were then exposed to a direct flow of salt fog created from the solution. The solution was passed through the chamber at a desired rate so that between 10,000 and 50,000 milligrams of salt was deposited on each square millimeter of exposed area during a 24 hour period.

The lids were exposed to the salt atmosphere at 95° F. for a period of 24 hours and the specimens were then removed from the chamber, washed in de-ionized water for five minutes, and visually examined for signs of corrosion under between 10× and 20× magnification. The specimens were found to be free of all signs of corrosion including discoloration, electrochemical degradation or corrosion sites. The test was repeated a number of times with the same results.

While this invention has been described in detail with reference to the specific embodiment set forth above, the invention is not intended to be limited to that specific structure, but is intended to cover any modifications or changes that may come within the scope and spirit of the invention, as defined in the following claims.

What is claimed is:

1. A process of forming a closure lid for hermetically sealing a housing for a semiconductor device, comprising the steps of:
    covering a sheet of an iron alloy base metal with a cladding layer of nickel or a nickel alloy, including mechanically working said sheet and said layer to press said layer against said base metal to reduce the porosity of the nickel or nickel alloy layer;
    dividing the clad sheet to produce a plurality of lids each with said nickel or nickel alloy cladding layer on a face surface but with said iron alloy base metal exposed on edges thereof where divided away from the reminder of the sheet;
    plating a layer of nickel or nickel alloy onto each said lid on the edges thereof; and
    plating a top layer of gold over said plated nickel or nickel alloy layer to a thickness of at least substantially 50 microinches.

2. The process of claim 1 wherein said nickel or nickel alloy cladding layer has a thickness of between 200 and 350 microinches.

3. The process of claim 1 wherein said plated nickel or nickel alloy layer has a thickness at said edge of at least 75 microinches.

4. The process of claim 1 wherein said cladding layer is substantially pure nickel.

5. The process of claim 1 wherein said cladding is applied to upper and lower surfaces of said iron alloy base metal sheet.

6. The process of claim 1 further comprising the step of bonding a solder frame to the gold electroplate layer at a periphery of the lid.

7. The process of claim 1 wherein said step of plating the nickel or nickel alloy layer includes electroplating in a controlled fashion to concentrate the plated layer on the edges of the lid.

8. A lid for hermetically sealing a housing for a semiconductor device, comprising a substrate formed of a sheet of an iron alloy base metal; a cladding layer of nickel or a nickel alloy applied to each of upper and lower surfaces of said substrate and mechanically worked to reduce the porosity of the nickel or nickel alloy layers, with edges of the substrate being unclad with such layers; nickel or nickel alloy plating deposited over said unclad lid and cladding layers in such a controlled fashion that the electroplated nickel or nickel alloy is concentrated on said edges; and a top layer of gold plating at least substantially 50 microinches thick atop the nickel or nickel alloy plating and over the entire lid.

9. A lid according to claim 8 wherein said cladding layers are between 200 and 350 microinches thick.

10. A lid according to claim 8 wherein the nickel or nickel alloy plating has a thickness at said edges of at least 75 microinches.

11. A lid according to claim 8 wherein the cladding layer is substantially pure nickel.

12. A lid according to claim 8 in which said cladding layers are nickel foil applied to the iron alloy base metal substrate and subsequently worked.

13. A lid according to claim 8 in which said cladding is formed as a nickel/noble metal/nickel sandwich.

* * * * *